United States Patent
Villeneuve

(10) Patent No.: US 6,866,114 B1
(45) Date of Patent: Mar. 15, 2005

(54) VEHICLE WHEEL TRANSMISSION

(75) Inventor: Arnaud Michel Villeneuve, Wolverhampton (GB)

(73) Assignee: GKN Technology Limited (GB)

( * ) Notice: Subject to any disclaimer, the term of this patent is extended or adjusted under 35 U.S.C. 154(b) by 0 days.

(21) Appl. No.: 10/240,867
(22) PCT Filed: Apr. 10, 2000
(86) PCT No.: PCT/GB00/01362
   § 371 (c)(1), (2), (4) Date: Feb. 12, 2003
(87) PCT Pub. No.: WO01/76903
   PCT Pub. Date: Oct. 18, 2001
(51) Int. Cl.[7] .............................................. B60K 7/00
(52) U.S. Cl. .................. 180/254; 180/65.5; 280/93.512
(58) Field of Search ............................. 180/65.1, 65.5, 180/253, 254; 280/93.512, 93.511

(56) References Cited

U.S. PATENT DOCUMENTS

| | | | |
|---|---|---|---|
| 3,302,739 A | * | 2/1967 | Beck et al. .................. 180/24 |
| 3,804,190 A | * | 4/1974 | Shaffer ....................... 180/253 |
| 4,385,677 A | * | 5/1983 | Sowers ....................... 180/254 |
| 5,224,563 A | * | 7/1993 | Iizuka et al. ............... 180/65.3 |
| 5,322,141 A | * | 6/1994 | Brunner et al. ............ 180/65.5 |
| 5,679,087 A | * | 10/1997 | Lutz ........................... 475/149 |
| 5,924,504 A | * | 7/1999 | Ruppert et al. ............... 180/61 |
| 6,148,945 A | * | 11/2000 | Alessandro et al. ........ 180/256 |
| 2002/0023791 A1 | * | 2/2002 | Kima et al. ................ 180/65.5 |

FOREIGN PATENT DOCUMENTS

DE  3150780  * 6/1983

* cited by examiner

Primary Examiner—Anne Marie Boehler

(57) ABSTRACT

A vehicle transmission comprising a vehicle chassis (10), a hub unit (20) for a driven wheel; a chassis mounted drive motor assembly (11) individual to the hub unit and pivoted to the chassis about an axis (12) passing through or adjacent to the center of gravity of the motor assembly; a shaft assembly connecting the drive motor assembly to a rotatable part (25) of the hub unit and comprising a shaft (31) connected to a fixed, constant-velocity, universal joint (26) at the outboard end of the shaft which is drivingly connected to the rotatable part of the hub unit; a wheel suspension (22, 23) connected between a non-rotatable part (21) of the hub unit and the chassis (10); and a rigid tube (19) connnecting the non-rotatable part of the hub unit to the motor assembly, the non-rotatable part (21) of the hub unit being pivotally mounted with respect tot the tube about the center of articulation of the universal joint and the shaft lying within said tube and being rigidly connected to the motor assembly.

13 Claims, 2 Drawing Sheets

VEHICLE WHEEL TRANSMISSION

TECHNICAL FIELD

This invention relates to vehicle transmissions and in particular to transmissions of the type wherein each driven wheel is driven by a separate motor. The motor may be electric, hydraulic or pneumatic.

BACKGROUND ART

Previously, in vehicles which have been driven by individual electric motors, either the electric motor has been connected directly to the wheel and is carried by the suspension as, for example, in U.S. Pat. No. 5,322,141 or, as shown in FIG. 2 of U.S. Pat. No. 5,679,087, the electric motors have been mounted rigidly on the vehicle chassis and connected to the driven wheels by drive shafts having a universal joint at each end.

The former construction increases the unsprung mass of the vehicle.

The object of the invention is to provide a vehicle transmission wherein one or more wheels is driven by its individual motor which may, for example, be electric but in which the motor is mounted on the chassis or support thus keeping the unsprung mass to a minimum but in which there is a simplified drive from the motor to the wheel and a simplified suspension linkage.

DISCLOSURE OF THE INVENTION

According to the invention we provide a vehicle transmission comprising a support, a hub unit for a driven wheel; a drive motor assembly individual to the hub unit and mounted on the support adjacent to the hub unit; a shaft assembly connecting the drive motor assembly to a rotatable part of the hub unit and comprising a shaft connected to a fixed, constant-velocity, universal joint at the outboard end of the shaft which is drivingly connected to the rotatable part of the hub unit; a wheel suspension connected between a non-rotatable part of the hub unit and the support; and a rigid tube connecting the non-rotatable part of the hub unit to the motor assembly, said non-rotatable part being pivotally mounted with respect to the tube about the center of articulation of the universal join; the shaft lying within said tube and being rigidly connected to the motor assembly, i.e. without any articulated joint, and the motor assembly being pivoted to the support about an axis passing through or adjacent to the center of gravity of the motor assembly.

Preferably the motor assembly is pivoted to the support in resilient bearings. Normally the hub will be steerable and the non-rotatable part of the hub unit pivoted with respect to the outer end of the tube. The outer end of the tube may be formed with an enlarged portion with an internal spherical surface, the non-rotatable part of the hub unit having a spherical portion which fits within said surface in a pivotal manner and wherein the centers of the spherical surfaces are coincident with the center of articulation of the universal joint.

Alternatively the outer end of the tube may be formed with a first arm which is pivoted to a curved arm to which the non-rotatable part of the hub unit is pivoted so that the pivotal axes of the connections between the arms and between the second arm and said non-rotatable part intersect at the center of articulation of the joint.

Normally the motor assembly will include a reduction gear and the motor may, be an electric, hydraulic or pneumatic motor.

BEST MODE FOR CARRYING OUT THE INVENTION

Figure 1:
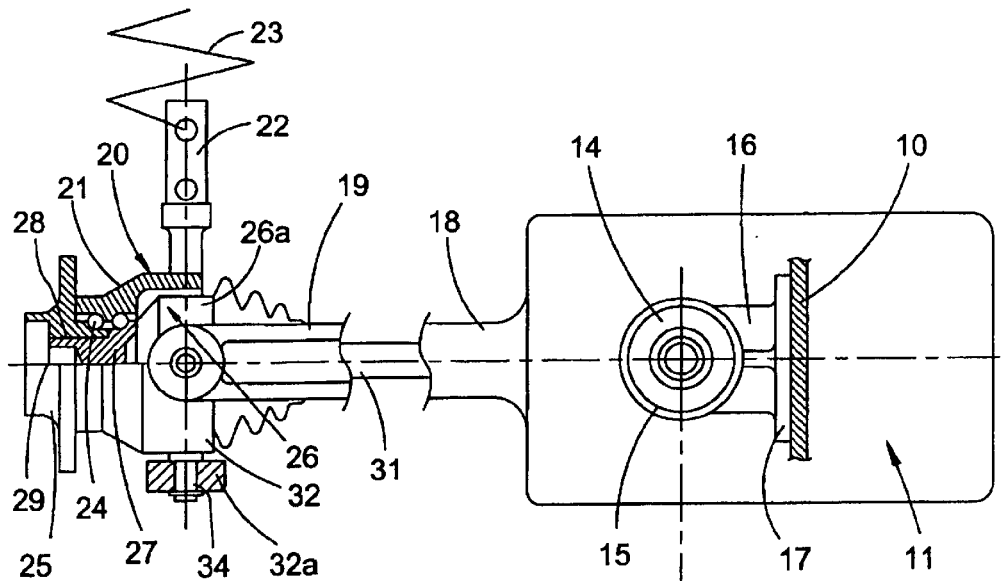
FIG. 1 is a side view of a vehicle transmission constituting a first embodiment of the invention.
Figure 2:
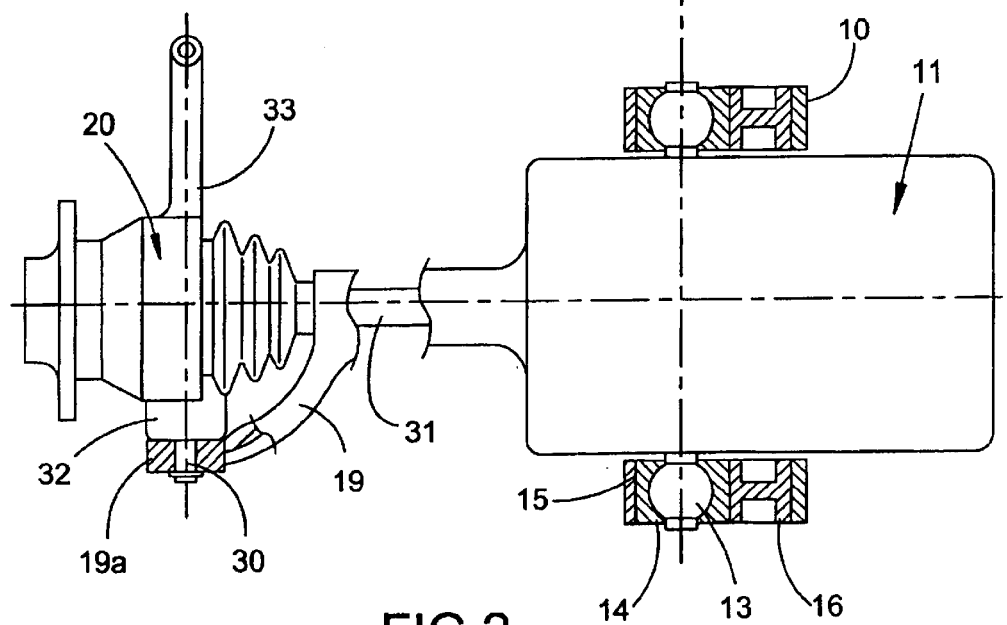
FIG. 2 is a plan view of the embodiment shown in FIG. 1.

Referring first to FIGS. 1 and 2, part of a vehicle chassis is shown at 10. Pivoted to the chassis 10 is an electric motor assembly 11 which includes a reduction gear. The assembly 11 is pivoted about an axis 12 which passes through or adjacent to its center of gravity. The motor assembly is pivoted in two similar flexible bearings each of which comprises a ball 13 secured to the motor assembly and received in a shaped sleeve 14. The sleeve 14 in turn is received in a bore 15 in a bracket 16 provided with a flange 17 for connection to the chassis 10.

Extending from the motor assembly 11 is a rigid tube 18 which has a curved arm 19 extending transversely from its outer end and being provided with a bore 19a which is parallel to the axis 12. A hub unit is indicated at 20 and includes an outer part 21 which forms part of a knuckle 22 which is connected to the vehicle suspension indicated diagrammatically at 23. The hub unit 20 contains a bearing 24 in which is mounted a wheel hub 25 to carry a driven road wheel, not shown. The hub 25 is connected to the outer part 26a of a fixed constant velocity joint 26. The outer part 26a has a spigot 27 which passes through a splined bore 28 In the hub and is formed over at 29 to hold It in place. One end of an arm 32 is pivoted to the curved arm 19 about an axis parallel to the axis 12 by a pin 30. The fixed part 21 of the hub unit 20 has a vertical spigot 34 which engages in a bore 32a in the other end of the arm 32 to pivot the fixed part 20 to the arm 19 about an axis perpendicular to the axis 12. The pivot axes of the pin 30 in the bore 19a and the spigot 34 in the bore 32a intersect at the center of articulation of the constant velocity joint 26. This arrangement allows suspension movement when the motor assembly 11 rotates around the axis 12.

A shaft 31 is connected to the rotor of the motor assembly 11 and at its outer end is connected to the inner part, not shown, of the constant velocity joint 26. The inner part drives the outer part 26a in the normal manner allowing articulation of the hub relative to the tube 18 and motor assembly 11. The, knuckle 22 can be steered about the spigot 34 by means of a steering arm 33 connected to the fixed part 21 of the hub unit.

It will be seen, therefore, that the assembly of the motor 11, the tube 18 with its arm 19, the curved, arm 32 and the fixed part 21 of the hub unit together form a link assembly of the vehicle suspension, the part 21 being connected to the suspension 23 through the knuckle 22. This makes a very light and simple arrangement where the wheels are driven by their individual motors. As mentioned above the axis of the pin 30 and the axis of the spigot 34 intersect at the articulation center of the joint 26.

Figure 3:
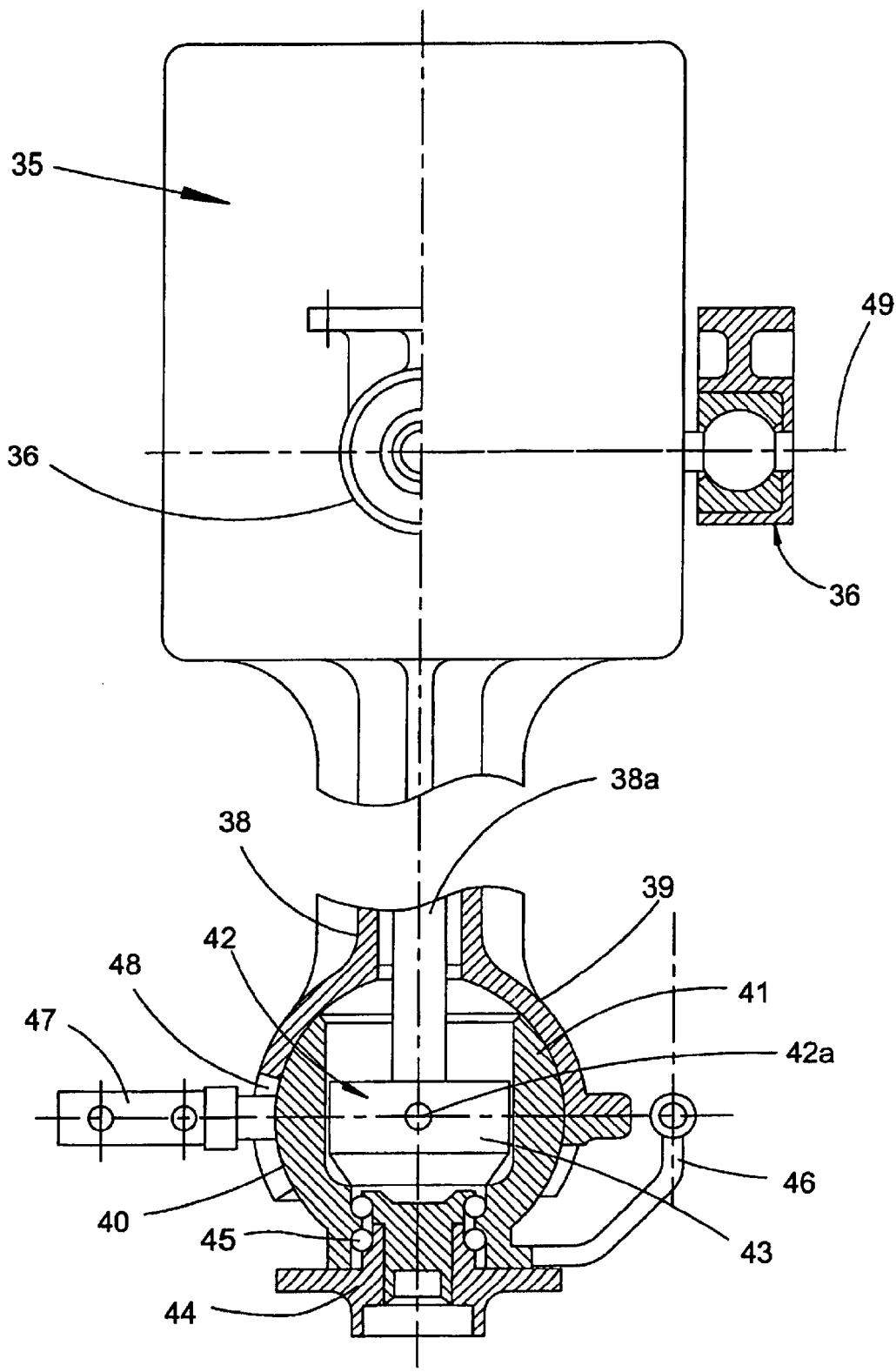
FIG. 3 is a composite sectional view of a second embodiment of the invention, the upper part being a vertical section and the lower part being a horizontal section.

Referring now to FIG. 3, an electric motor assembly is indicated at 35 and as before includes an electric motor and a reduction gear box. The motor is mounted to the chassis (not shown) by bearings 36 similar to those described in relation to FIGS. 1 and 2. A tube 38 extends outwardly from the motor assembly 35 and at its outer end is provided with an enlarged portion 39 which provides a spherical inner surface 40. Mounted within the spherical surface 40 is an externally spherical member 41 which is free to move within the enlarged member 39 with the inner and external spherical surfaces in contact. A shaft 38a is driven by the motor and is connected to the inner member, not shown, of a fixed constant velocity joint 42. The outer member 43 of the constant velocity joint is connected as described in relation to FIGS. 1 and 2 to a hub 44 which can receive a road wheel. The hub 44 is mounted in a bearing 45 within the spherical member 41 so it is free to rotate therein. The hub can be steered by pivoting the spherical member 41 within the portion 39 by means of a steering arm 46. The centers of the spherical surfaces on the members 39 and 41 are coincident with the articulation center 42a of the joint 42.

The spherical member 41 is also connected to a knuckle 47 which in turn is connected to the vehicle suspension as in FIG. 1 and 2. The enlarged member 39 has a slot 48 through which the knuckle passes to allow for suspension movement.

The operation is as described in relation to FIGS. 1 and 2 thus the motor assembly 35 being pivoted about an axis 49 which passes through or adjacent to its center of gravity by means of supports 36 forms with the tube 38 and the member 39 one link of the suspension and the other link of the suspension is formed by the spherical member 41 and the knuckle 47. As before the hub 44 is driven via the shaft 38a and the constant velocity joint 42. The arrangement provides a simple and effective drive and suspension arrangement where each wheel is to be driven by its own electric motor.

In each embodiment the motor assembly 11 or 35 is pivoted about or adjacent to its center of gravity and is therefore balanced and this therefore reduces the unsprung mass of the wheel and knuckle.

Although the motor assembly in each case has been described as being pivoted about its center of gravity it could also be pivoted about the center of gravity of the combined motor assembly, tube, constant velocity joint, hub etc. so as to further reduce the unsprung weight. In any event the assembly is substantially balanced. In some circumstances however it may be advantageous for the assembly to be slightly unbalanced in a direction effectively to reduce the unsprung weight.

It will be seen that the invention provides an improved arrangement for individual driving and suspension of vehicle wheels. The motors used may be electric, hydraulic or pneumatic. The invention is primarily intended to be used in road vehicles but may find other applications. The invention reduces the inertia of the wheel assembly and therefore allows the shock absorbers to work more efficiently.

What is claimed is:

1. A vehicle transmission comprising:

a support, a hub unit for a driven wheel;

a drive motor assembly individual to the hub unit and mounted on the support adjacent to the hub unit;

a shaft assembly connecting the drive motor assembly to a rotatable part of the hub unit and comprising a shaft connected to a constant-velocity, universal joint at an outboard end of the shaft which is drivingly connected to the rotatable part of the hub unit;

a wheel suspension connected between a non-rotatable part of the hub unit and the support; and a rigid tube connecting the non-rotatable part of the hub unit to the motor assembly, said non-rotatable part being pivotally mounted with respect to the tube about the center of articulation of the universal joint, the shaft lying within said tube and being rigidly connected to the motor assembly, and the motor assembly being pivoted to the support about an axis passing through or adjacent to the center of gravity of the motor assembly.

2. A transmission according to claim 1 wherein the motor assembly is pivoted to the support in resilient bearings.

3. A transmission according to claim 1 wherein the hub is steerable and the non-rotatable part of the hub unit is pivoted about a center of articulation of the universal joint.

4. A transmission according to claim 3 wherein an outer end of the tube is formed with an enlarged portion with an internal spherical surface, the non-rotatable part of the hub unit having a spherical portion which fits within said internal spherical surface in a pivotas manner, the centers of the spherical surfaces being coincident with the center of articulation of the universal joint.

5. A transmission according to claim 3 wherein an outer end of the tube is formed with a first arm to which is pivoted a curved arm to which the non-rotatable part of the hub is pivoted and wherein the pivotal axes of the connections between the arms and between the second arm and said non-rotatable part intersect at the center of articulation of the joint.

6. A transmission according to claim 1 wherein the motor assembly includes a reduction gear.

7. A transmission according to claim 1 wherein the motor assembly includes an electric, hydraulic or pneumatic motor.

8. A transmission according to claim 2 wherein the hub unit is steerable and the non-rotatable part of the hub unit is pivoted about a center of articulation of the universal joint.

9. A transmission according to claim 8 wherein an outer end of the tube is formed with an enlarged portion with an internal spherical surface, the non-rotatable part of the hub unit having a spherical portion which fits within said internal spherical surface in a pivotal manner, the centers of the spherical surfaces being coincident with the center of articulation of the universal joint.

10. A transmission according to claim 8 wherein an outer end of the tube is formed with a first arm to which is pivoted a curved arm to which the non-rotatable part of the hub is pivoted and wherein the pivotal axes of the connections between the arms and between the second arm and said non-rotatable part intersect at the center of articulation of the joint.

11. A transmission according to claim 8 wherein the motor assembly includes an electric, hydraulic or pneumatic motor.

12. A transmission according to claim 9 wherein the motor assembly includes an electric, hydraulic or pneumatic motor.

13. A transmission according to claim 10 wherein the motor assembly includes an electric, hydraulic or pneumatic motor.

\* \* \* \* \*